March 21, 1967 E. W. D'ARCY 3,310,636
FILM STABILIZER MECHANISM FOR PROJECTORS, CAMERAS, AND PRINTERS
Filed Feb. 7, 1961 3 Sheets-Sheet 1
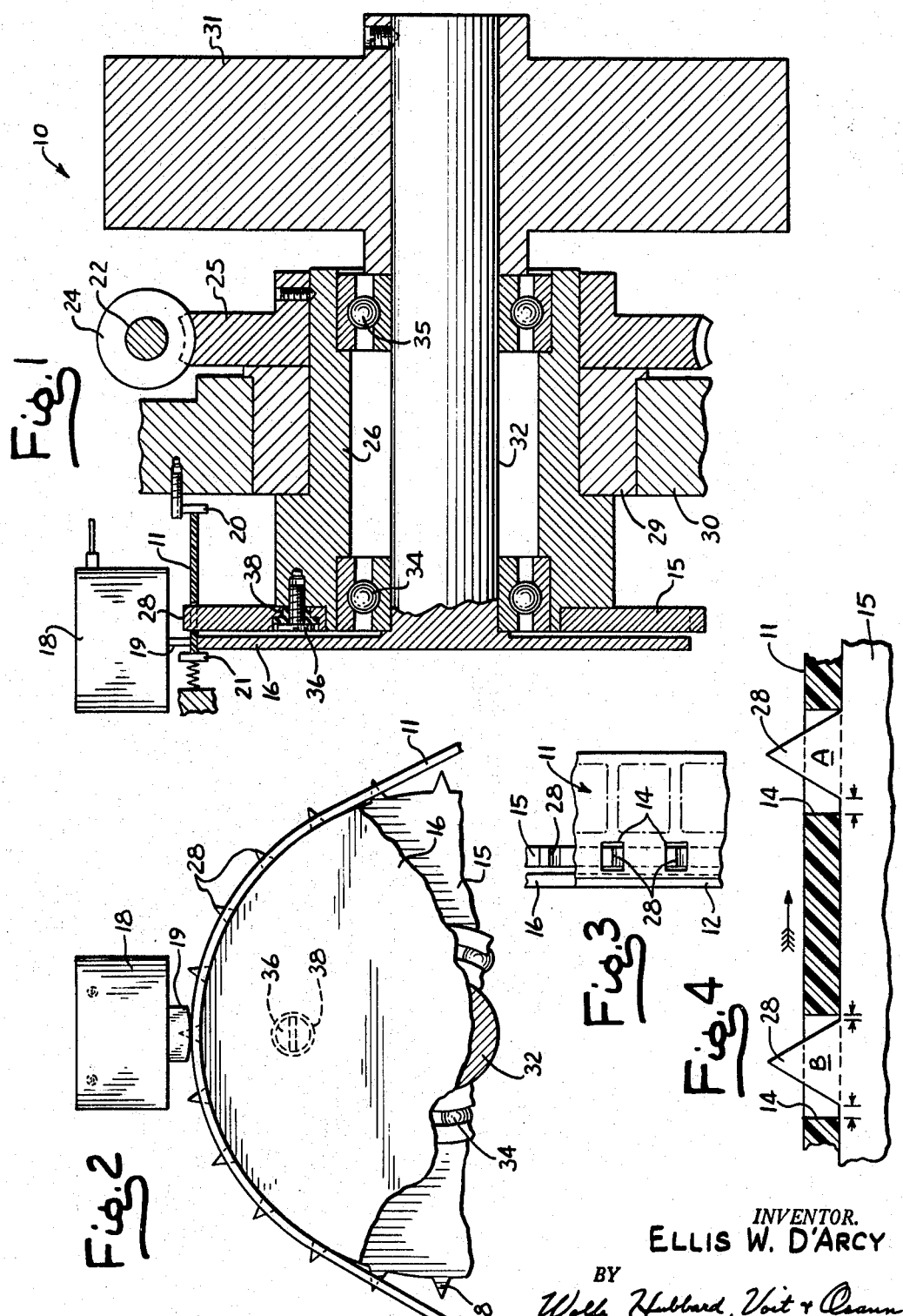
INVENTOR.
ELLIS W. D'ARCY
BY
Wolf, Hubbard, Voit & Osann
ATTYS.

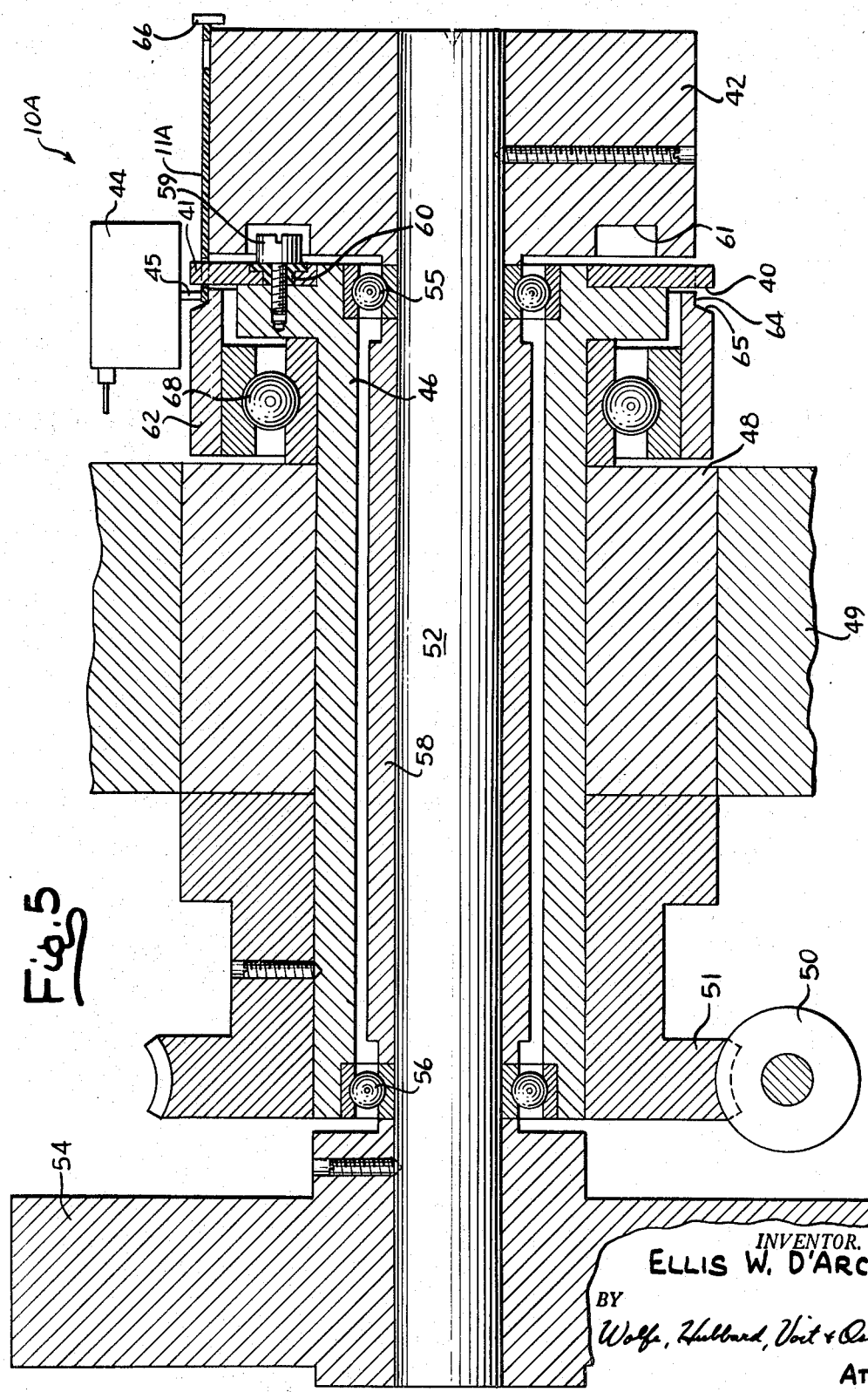

March 21, 1967 E. W. D'ARCY 3,310,636
FILM STABILIZER MECHANISM FOR PROJECTORS, CAMERAS, AND PRINTERS
Filed Feb. 7, 1961 3 Sheets-Sheet 3
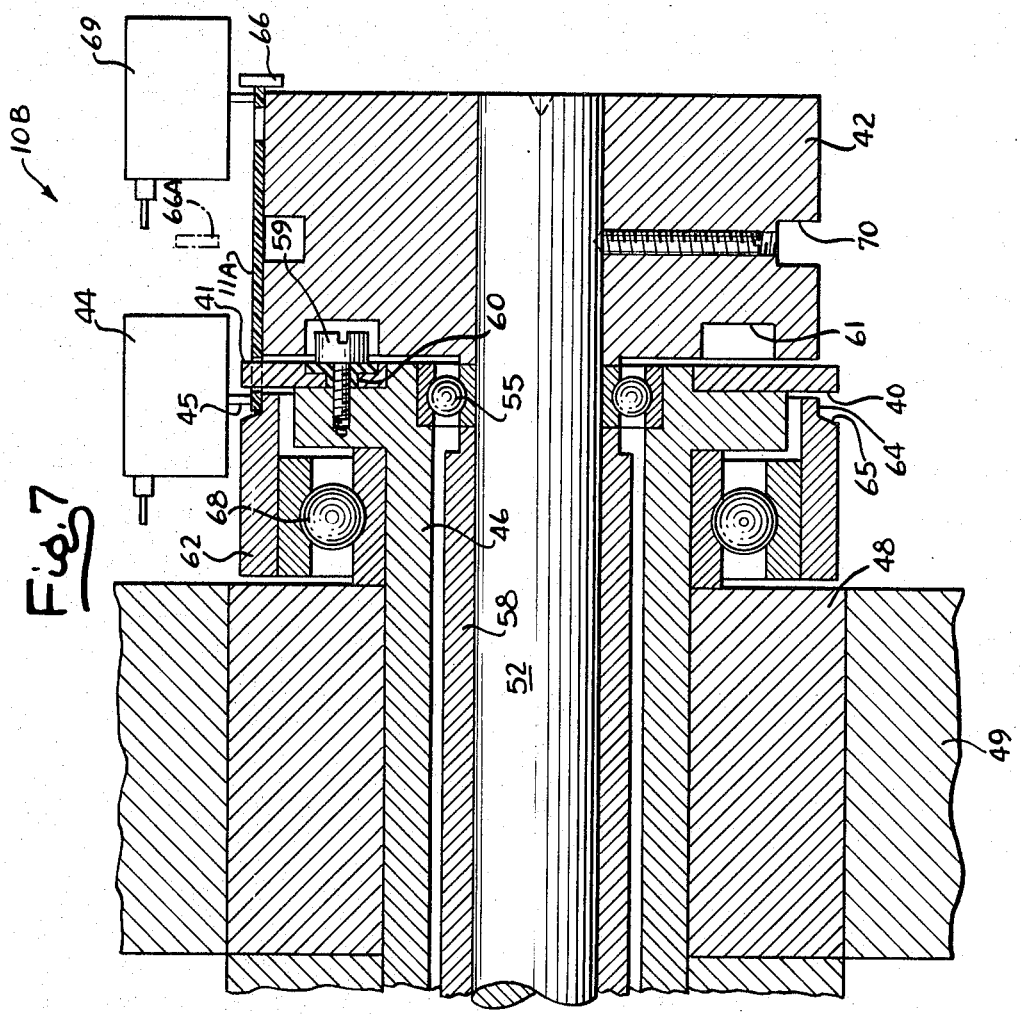
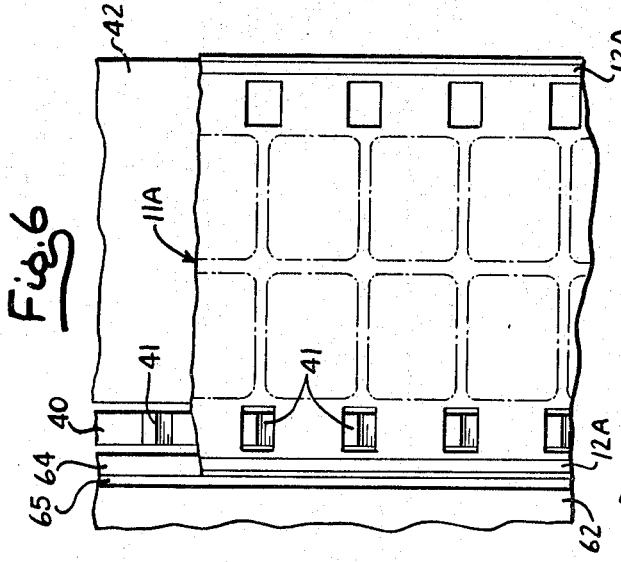
INVENTOR.
ELLIS W. D'ARCY
BY
Wolfe, Hubbard, Voit & Osann
ATTYS.

United States Patent Office 3,310,636
Patented Mar. 21, 1967

3,310,636
FILM STABILIZER MECHANISM FOR PROJECTORS, CAMERAS, AND PRINTERS
Ellis W. D'Arcy, P.O. Box 1130 C,
Ogden Dunes, Ind. 46401
Filed Feb. 7, 1961, Ser. No. 87,647
3 Claims. (Cl. 179—100.2)

The present invention relates to devices for stabilizing the movement of sound film during recording or reproduction and, more specifically, to a novel film-driven stabilizer mechanism finding particular but not exclusive utility in film projection, cameras, and editing and printing equipment.

One object of the invention is to provide a film stabilizer mechanism of relatively inexpensive construction and entailing a greatly simplified threading pattern, rendering said mechanism particularly adaptable for use in projectors and cameras for home and amateur use.

Another object is to provide a film stabilizer mechanism of the character set forth and which will be susceptible of effective use in projectors and cameras having a self-threading feature embodied therein.

A further object is to provide a film stabilizer mechanism of the foregoing type and which will be effectively close coupled with the film drive and sound head to permit operation in dead synchronism with the photograph sequence on the film, and so as to be capable of operation with equal facility under forward or reverse motion of the film.

Still another object is to provide a film stabilizer mechanism of the foregoing character adapted to reach effective operating speed more quickly than such mechanism of the type known heretofore, and which will have particularly good start-stop operating characteristics.

Other objects and advantages will become apparent as the following description proceeds, taken together with the accompanying drawings wherein:

FIGURE 1 is a longitudinal sectional view through an illustrative film stabilizer mechanism embodying the present invention and applied to a relatively small home movie projector.

FIG. 2 is a side elevation of the film stabilizer mechanism illustrated in FIG. 1.

FIG. 3 is an enlarged fragmentary plan view detailing a portion of the film as it comes into contact with elements of the stabilizer mechanism.

FIG. 4 is an enlarged fragmentary, diagrammatic view detailing the relationship of the film to the teeth of the driving sprocket.

FIG. 5 is an enlarged longitudinal sectional view through another illustrative film stabilizer mechanism also embodying the invention and applied to a camera.

FIG. 6 is an enlarged fragmentary plan view detailing a portion of film in relation to certain elements of the stabilizer mechanism of FIG. 5.

FIG. 7 is an enlarged longitudinal sectional view showing still another film stabilizer mechanism embodying the invention but in this instance applied to a printer.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Referring more specifically to FIGS. 1 and 3, inclusive, the invention is there shown embodied in an illustrative stabilizer mechanism 10 which happens to be incorporated in a relatively small 8 mm. sound projector. The latter is adapted to operate with film 11 having a magnetic sound track 12 and a series of sprocket apertures 14. The film is trained over a drive sprocket 15 and an inertia-loaded film drum 16 spaced laterally therefrom. Adjacent the sprocket and drum 15, 16 is a magnetic pick-up head 18 having a projecting pole piece 19 which bears against the film passing the head. Fixed guide finger 20 and resilient guide finger 21 serve to position the film so that its sound track 12 is maintained in accurate alignment with the pole piece 19. The latter is disposed with its gap (not shown) perpendicular to the sound track.

The film is driven from a suitable power source (not shown) via drive shaft 22, drive worm 24, worm wheel 25, drive sleeve 26, and sound sprocket 15 having teeth 28 which mesh with the apertures 14 of the film. The worm wheel 25, sleeve 24 and sprocket 15 all comprise a unitary assembly which is journaled in a main support bearing 29 mounted in a frame 30 of the projector.

While the sound sprocket 15 is driven at substantially uniform speed, inevitable variations in the relationship between the film and the sprocket tend to introduce highly undesirable aberrations in the motion of the film as it passes the magnetic head 18. Normally, the sprocket apertures 14 have a longitudinal dimension slightly larger than the root dimension of the sprocket teeth, this being a matter of design and the difference being only a matter of a few thousandths of an inch. As the film is engaged by the sprocket, the driving force at any one instant is almost invariably transmitted by a single tooth. Under such circumstances, illustrated diagrammatically in FIG. 4 where tooth A is driving, the backlash with the sprocket aperture is taken up in the direction of film movement and all of the clearance is on the trailing side of the tooth. With continued motion of the sprocket and film, the drive will be transferred to another tooth, for example the tooth B. This transfer is so rapid that it tends to introduce high velocity transient disturbances into the motion of the film. These disturbances, which may be further accentuated by dimensional variations in the film or the sprocket, produce the well-known "flutter" and "wow" effects. The elimination of such disturbances and their effects has been the subject of much activity heretofore, with varying degrees of success.

In the mechanism 10, provision is made for stabilizing the motion of the sprocket driven film 11 by maintaining the sound sprocket 15 and the drum 16 in relatively close but laterally spaced relation with each other and drivingly coupling them together only through the lateral dimension of the film as it passes the magnetic head. In furtherance of such objective, the film drum 16 is freely journaled and concentrically mounted with respect to the sprocket 15 and is provided with inertia loading in the form of flywheel 31. In this case, the drum 16 is integrally fixed to a support shaft 32 journaled in anti-friction bearings 34, 35 carried by the drive sleeve. The end of the shaft 32 remote from the drum carries the flywheel 31 which may be fixed thereto in any suitable manner. The drum 16 and sprocket 15 are arranged with a relatively close but definite lateral spacing which may, for example, be on the order of 0.005 inch. While such lateral spacing may vary somewhat, it has been found effective to locate the parts so that the adjacent edge of the drum approaches the sprocket apertures 14 of the film, thus insuring that the only connection between the sprocket and the drum at the sound head is defined by the relatively stiff, inflexible lateral portion of the film.

Means are provided for sound scanning the film immediately adjacent the drive sprocket 15 between the latter and the closest longitudinal edge of the film. This is accomplished by stabilizing the motion of the film at the point of scan and positively backing up the film at that point as an incident to such stabilization. In the present instance, it will be noted upon reference to FIGS. 1 and 2 that the drum 16 is fashioned of relatively thin disk-like form so that it engages the film on the area underlying the sound track and particularly the segment of the sound track in contact with pole piece 19 of the magnetic head 18. With the critical sound track portion of the film thus positively confined between the pole piece 19 and the drum 16 by these members and by the lateral guides 20, 21, and with its velocity stabilized, recording and reproduction of sound are carried out under optimum conditions. This has been borne out by comprehensive tests.

For certain applications where even greater stabilization of film motion and fidelity of sound recording and reproduction are required, the film drive sprocket may be resiliently coupled to its own driving means. In furtherance of such objective, the drive sprocket is made of thin wafer-like form with relatively low mass and is mounted so as to have a limited amount of float with respect to its driving means. The resilient coupling medium may be yieldable material such as rubber, or some spring means, or a combination of these. Referring more specifically to FIGS. 1 and 2, it will be noted that in this instance the sprocket 15 is coupled to its associated drive sleeve 26 by means of one or more resilient connections each in the form of a cap screw 36 with a surrounding bushing 38 of yieldable material such as soft rubber. The cap screw 36 engages a tapped hole in the drive sleeve and the resilient bushing 38 associated therewith is seated in a suitably formed recess in the sprocket 15.

Turning now to FIG. 5, another illustrative embodiment of the invention is there shown in the form of a stabilizer mechanism 10A adapted for incorporation into a relatively small sound camera. The mechanism 10A includes a film drive sprocket 40 having a plurality of teeth 41. Closely but definitely spaced laterally from said sprocket, is an inertia-loaded film drum 42 of suitable width to accommodate a 16 mm. or double 8 mm. film 11A such as shown in FIG. 6. The sound track portion 12A of the film in this case is immediately adjacent, but on the opposite side, of the sprocket 40 from the drum 42. Mounted in close proximity to the sprocket 40 is a magnetic head 44 having a projecting pole piece 45 adapted to bear against the passing sound track. The lateral dimension of the film 11A passing the magnetic head 44 serves to couple the inertia-loaded film drum 42 to the drive sprocket 40, thereby stabilizing the motion of the film passing the magnetic head 44.

In furtherance of such arrangement, the drive sprocket 40 is connected to a drive sleeve 46 journaled in a sleeve bearing 48 in the frame 49 of the camera. The sprocket and drive sleeve 40, 46, are driven from a suitable power source as by means of worm 50 and worm wheel 51, the latter being rigidly fixed to the drive sleeve in any suitable manner. The drum 42 is freely journaled and concentrically mounted with respect to the drive sprocket 40, being rigidly fixed to support shaft 52 which extends through the drive sleeve and has a flywheel 54 secured at its opposite end. The drum, shaft, and flywheel are positioned by means of antifriction bearings 55, 56 and spacer sleeve 58, all housed within drive sleeve 46.

In certain instances, as discussed earlier herein with respect to the mechanism 10, the drive sprocket 40 of the mechanism 10A may be resiliently coupled to its driving means to provide greater stabilization of film motion and enhanced recording and reproduction of sound. The sprocket 40 is of wafer-like form and has a relatively low mass. It is resiliently connected to the drive sleeve 46 as by means of one or more cap screws 59 each surrounded by means of a resilient bushing 60 of material such as soft rubber, the latter being seated in a complemental recess in the sprocket. To provide clearance for the head of one or more of the screws 59, the adjacent face of the drum 42 may be formed with a suitable annular recess 61.

Provision is made in the mechanism 10A for sound scanning the film immediately adjacent the drive sprocket between the latter and the closest longitudinal edge of the film by stabilizing the motion of the film at the point of the scan and positively backing up the film at that point. In this case, however, a second drum 62, mounted in closely spaced relation between the sprocket 40 and the sleeve bearing 48, is utilized as the back-up medium. For this purpose, the drum 62 is fashioned with a supporting and locating shoulder 64 adjacent the drive sprocket and which is adapted to underlie the sound track portion of the film between the drive sprocket and the closest edge of the film. The shoulder 64 terminates at its inner edge in an abrupt perpendicular guide wall a few thousandths of an inch in height (not shown in detail) and which then merges into a flaring angular shoulder 65. Cooperating with the supporting and locating shoulder 64 is a guide finger 66 at the outer edge of the drum 42 and which may be resiliently biased so as to maintain bearing engagement with the slightly overhanging marginal edge of the film remote from the sprocket.

In this instance, the drum 62 is journaled concentrically with but independently of the drum 42 and the sprocket 40, being carried on a relatively large antifriction bearing 68 mounted on the sprocket end portion of the drive sleeve 46. By reason of this arrangement, the critical sound track portion of the film 11A is positively confined between the pole piece 45 and the drum 62, its velocity being stabilized by the action of the inertia-loaded drum 42.

Referring next to FIG. 7, there is shown still another embodiment of the invention in the form of a stabilizer mechanism 10B incorporated into a magnetic sound printer. Since the mechanism 10B is rather similar to the mechanism 10A, like reference numerals will be used for like parts and it will not be necessary to repeat the description of all the common features between the two. For the present, it will suffice to note that the mechanism 10B includes drive sprocket 40 and film drum 42 mounted as in the mechanism 10A and similarly coupled by the lateral dimension of the film 11A as it passes the point of scan. For the latter purpose, the mechanism 10B has two sound heads 44 and 69 adapted to print magnetically on both sound tracks of the double 8 millimeter film 11A.

While printing is often done on double 8 millimeter film prior to splitting it into two separate strips, the mechanism 10B is also adapted to print a single 8 millimeter film strip. For this condition, the film drum 42 has a central peripheral groove 70 adapted to serve as a clearance space for a guide finger 66A which may be shifted down into position so as to bear against the guiding edge of the single width film, in other words, the edge remote from the sprocket, as the film passes the head 44.

I claim as my invention:

1. A film driven stabilizer mechanism for projectors, cameras and printers operable with film having a series of sprocket apertures adjacent one lateral edge thereof and a magnetic sound track between said apertures and said one lateral edge, said mechanism comprising, in combination, a magnetic sound head, a film drive sprocket adjacent said sound head and adapted to move the film past said head, a first film drum rotatably disposed in relatively close laterally spaced relation with one side of said drive sprocket, a second film drum rotatably disposed in relatively close laterally spaced relation with the other side of said drive sprocket, means for positively maintaining a running clearance between each said drum and said sprocket, one of said drums being inertia-loaded, the other of said drums having a portion disposed in underlying relation with the sound track as the film passes said sound head.

2. A film driven stabilizer mechanism for projectors, cameras and printers operable with film having a series of sprocket apertures adjacent one lateral edge thereof and a magnetic sound track between said apertures and said one lateral edge, said mechanism comprising, in combination, of a magnetic sound head, a film drive sprocket adjacent said sound head and adapted to move the film past said head, a first film drum rotatably disposed in relatively close laterally spaced relation with one side of said drive sprocket, an inertia loading means connected to said first drum, a second film drum rotatably disposed in relatively close laterally spaced relation with the other side of said drive sprocket, said second film drum having a portion disposed in underlying relation with the sound track as the film passes said sound head, thrust bearing means for maintaining a running clearance between each said drum and said sprocket, and means for guiding the film laterally as it passes over said drums and by said head.

3. A film driven stabilizer mechanism for projectors, cameras and printers operable with film having a series of sprocket apertures adjacent one lateral edge thereof and a magnetic sound track between said apertures and said one lateral edge, said mechanism comprising, in combination, a pair of axially alined magnetic sound heads, a film drive sprocket adjacent one of said sound heads and adapted to move the film past said one head, a first film drum rotatably disposed in relatively close laterally spaced relation with one side of said drive sprocket, an inertia loading means connected to said first drum, a second film drum rotatably disposed in relatively close laterally spaced relation with the other side of said drive sprocket, said second film drum having a portion disposed in underlying relation with the sound track as the film passes said one sound head, thrust bearing means for maintaining a running clearance between each said drum and said sprocket, and means for guiding the film laterally as it passes over said drums and by said heads.

References Cited by the Examiner

UNITED STATES PATENTS

| | | | |
|---|---|---|---|
| 2,493,056 | 1/1950 | Bartelson | 226—198 |
| 2,518,556 | 8/1950 | Kolb et al. | 179—100.2 |
| 2,542,506 | 2/1951 | Gibson | 179—100.2 |

FOREIGN PATENTS

| | | |
|---|---|---|
| 861,049 | 12/1952 | Germany. |
| 580,273 | 9/1946 | Great Britain. |
| 662,124 | 11/1951 | Great Britain. |

BERNARD KONICK, *Primary Examiner.*

NEWTON N. LOVEWELL, IRVING L. SRAGOW,
*Examiners.*

J. FRANK, J. R. GOUDEAU, T. W. FEARS,
*Assistant Examiners.*